United States Patent
Johnson et al.

(10) Patent No.: US 7,440,360 B2
(45) Date of Patent: *Oct. 21, 2008

(54) APPARATUS AND METHOD FOR RETRIEVING DATA RELATED TO A DATA CARTRIDGE IN A MEDIA STORAGE SYSTEM

(75) Inventors: Kristianne E Johnson, Ft Collins, CO (US); Kelly J Reasoner, Ft Collins, CO (US); Richard Lynn Gardner, Jr., Greeley, CO (US); Paul C Coffin, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 862 days.

This patent is subject to a terminal disclaimer.

(21) Appl. No.: 10/640,708

(22) Filed: Aug. 13, 2003

(65) Prior Publication Data

US 2004/0047247 A1 Mar. 11, 2004

Related U.S. Application Data

(63) Continuation of application No. 09/790,754, filed on Feb. 22, 2001, now Pat. No. 6,663,003, which is a continuation-in-part of application No. 09/754,955, filed on Jan. 4, 2001, now Pat. No. 6,870,797.

(51) Int. Cl.
 *G11B 21/10* (2006.01)
(52) U.S. Cl. ............ 369/30.43; 369/30.45; 369/178.01; 235/385; 235/375

(58) Field of Classification Search ............... 369/30.36, 369/30.34, 30.45, 30.49, 30.43, 30.64, 30.29, 369/30.39; 235/385, 375, 462.01, 462.08, 235/462.12; 360/92, 71, 132, 92.1; 700/214
See application file for complete search history.

(56) References Cited

U.S. PATENT DOCUMENTS

| | | | |
|---|---|---|---|
| 4,839,875 | A | 6/1989 | Kuriyama et al. |
| 5,034,904 | A | 7/1991 | Moy |
| 5,303,214 | A | 4/1994 | Kulakowski et al. |

(Continued)

FOREIGN PATENT DOCUMENTS

EP 1039410 A1 9/2000

(Continued)

OTHER PUBLICATIONS

RFID Transponders Will Enable Faster Back-up . . . , Hewlett-Packard/Philips Semiconductors Press Release Sunnyvale, CA, Nov. 1, 1999, 2 Pages.

(Continued)

*Primary Examiner*—Hoa T. Nguyen
*Assistant Examiner*—Kim-Kwok Chu

(57) ABSTRACT

An apparatus and method for retrieving data related to a data cartridge contained in a multi-plane media storage system. One or more data retrieval devices are attached to the cartridge access device. A transponder is attached to the data cartridge for storing the related data, and at least one reader attached to a cartridge access device of the media storage system is positionable adjacent the data cartridge for reading the related data from the transponder. A scanner adapted to scan bar code indicia on the data cartridges may also be attached to the cartridge access device at the opposite end from the reader.

16 Claims, 9 Drawing Sheets

U.S. PATENT DOCUMENTS

| | | | |
|---|---|---|---|
| 5,450,254 | A | 9/1995 | Sato et al. |
| 5,455,409 | A | 10/1995 | Smith et al. |
| 5,729,464 | A * | 3/1998 | Dimitri ................... 700/215 |
| 5,870,245 | A | 2/1999 | Kersey et al. |
| 5,880,443 | A | 3/1999 | McDonald et al. |
| 5,963,134 | A | 10/1999 | Bowers et al. |
| 5,971,281 | A | 10/1999 | Frary et al. |
| 6,088,182 | A * | 7/2000 | Taki et al. ................... 360/71 |
| 6,100,788 | A | 8/2000 | Frary |
| 6,138,909 | A | 10/2000 | Rockwell et al. |
| 6,155,766 | A | 12/2000 | Ostwald et al. |
| 6,160,786 | A | 12/2000 | Coffin et al. |
| 6,175,539 | B1 | 1/2001 | Holmquist et al. |
| 6,201,474 | B1 | 3/2001 | Brady et al. |
| 6,231,291 | B1 | 5/2001 | Mueller et al. |
| 6,262,863 | B1 * | 7/2001 | Ostwald et al. .......... 369/30.43 |
| 6,523,749 | B2 | 2/2003 | Reosoner et al. |
| 6,618,348 | B1 | 9/2003 | Coffin et al. |
| 6,663,003 | B2 * | 12/2003 | Johnson et al. ............. 235/385 |
| 6,870,797 | B2 * | 3/2005 | Reasoner et al. ......... 369/30.29 |

FOREIGN PATENT DOCUMENTS

| | | |
|---|---|---|
| JP | 04-157690 | 5/1992 |
| JP | 06-052657 | 2/1994 |
| JP | 07-210971 | 8/1995 |
| JP | 10-228753 | 8/1998 |
| JP | 11-316996 | 11/1999 |
| JP | 2000-076770 | 3/2000 |
| JP | 2000-285658 | 10/2000 |
| JP | 2001-189044 | 7/2001 |
| WO | 00/57354 | 9/2000 |

OTHER PUBLICATIONS

English Translation of the Japanese Office Action dated Aug. 7, 2007 for the counterpart Japanese Patent Application No. 2002-035262.

* cited by examiner

APPARATUS AND METHOD FOR RETRIEVING DATA RELATED TO A DATA CARTRIDGE IN A MEDIA STORAGE SYSTEM

CROSS REFERENCE TO RELATED APPLICATION(s)

This is a continuation of application Ser. No. 09/790,754 filed on Feb. 22, 2001 (now U.S. Pat. No. 6,663,003), which is a continuation-in-part of U.S. patent application Ser. No. 09/754,955 filed Jan. 4, 2001 (now U.S. Pat. No. 6,870,797), both of which are hereby specifically incorporated by reference for all that is disclosed therein.

FIELD OF THE INVENTION

The invention pertains to retrieving data related to a data cartridge in a media storage system, and more specifically, to retrieving the related data from a transponder attached to the data cartridge using a reader attached to a cartridge access device of the media storage system.

BACKGROUND OF THE INVENTION

Media storage systems are commonly used to store data cartridges and to retrieve desired data cartridges so that computer readable data may be written to or read from the data cartridges. As such, large volumes of computer readable data can be stored on numerous data cartridges and accessed by a single computer or by multiple computers connected to the media storage over a network. Such media storage systems are often referred to as "juke box" storage systems, and may include a cartridge storage rack or "magazine" and a cartridge read/write device. The cartridge storage rack serves as a storage location for the data cartridges. Multiple storage racks are commonly arranged so that they form one or more adjacent vertical stacks which define a single cartridge access plane. In multi-plane media storage systems, storage racks and read/write device(s) may be positioned across from one another, or arranged in a U-shaped configuration. The media storage system also includes a cartridge access device for moving among and accessing the data cartridges stored therein. In multi-plane media storage systems where storage racks are positioned across from one another, the cartridge access device may be positioned between the storage rack planes.

When a computer connected to the media storage system issues a request to access a data cartridge to read and/or write data thereto, a control system moves the cartridge access device among the storage racks until the cartridge access device is positioned adjacent the requested data cartridge. The cartridge access device then removes the data cartridge from the storage rack and delivers it to the read/write device for the computer to access the computer readable data stored thereon.

Once a request to access a data cartridge is received, the control system must be able to locate or otherwise recognize the requested data cartridge in the storage rack. One solution is to maintain a "map" indicating the identity and position of each data cartridge in the storage rack. However, the map must be periodically updated to ensure that the map contains accurate data. Events that will usually indicate a need to update the map include, but are not limited to, adding or removing a data cartridge from the system, operating a cartridge "mail slot", or a system power cycle (i.e., if the data storage system is turned off). Likewise, when the computer readable data contained on an existing data cartridge in the storage rack is changed, the map must be updated to reflect the changed content of the data cartridge at that position. Other examples where the map must be updated include, moving a data cartridge to another position in the storage rack, adding another storage rack to the media storage system, or otherwise changing the configuration of the system.

One solution to maintaining the map is to manually inventory the media storage system each time a change occurs. However, this is time consuming and prone to human error. Another solution for maintaining the map is to label each data cartridge stored in the media storage system with a machine-readable code, such as a bar code label and to read the bar code label with a scanner attached to the cartridge access device. However, the data cartridges may be positioned in the storage rack in close proximity to one another. Therefore, the cartridge access device and the data cartridge must be carefully aligned to correctly scan the bar code. Furthermore, the bar code only contains limited information (e.g., an identification number), and cannot be rewritten. Any further information must be stored separately (e.g., in a "look-up" table or other suitable database). For example, a "lookup" table may associate the identification number contained on the bar code with a date, data format, data type, etc.

Therefore, a need exists for a system to read and store the cartridge identification and other data related to the data cartridge. Ideally, such a system can store the cartridge identification and other data without the need for separate "look-up" tables. In multi-plane systems, it would be most desirable to provide such a system which can quickly and efficiently read and store data from cartridges located in multiple cartridge access planes.

SUMMARY OF THE INVENTION

The present invention is directed to an apparatus for retrieving data related to multiple data cartridges contained in a media storage system having multiple cartridge access planes. The apparatus may comprise a cartridge access device for retrieving and transporting the data cartridge within the system. First and second data retrieval devices may be attached to the cartridge access device and oriented in opposite directions. The data retrieval devices may comprise one or more reader(s) adapted to receive transmitted data signals from a transponder located within each of the data cartridges. One of the data retrieval devices may also be a scanner adapted to retrieve information from bar code indicia on each of the data cartridges.

A method for retrieving data related to multiple data cartridges in a multi-plane media storage system is also disclosed. The method includes the following steps: positioning the first end of the cartridge access device adjacent to a first data cartridge; transmitting a data signal containing data related to the first data cartridge; and receiving the transmitted data signal at a first reader attached to the cartridge access device and oriented in a first direction. The method may further comprise the steps of positioning the second end of the cartridge access device adjacent to a second data cartridge; transmitting a data signal containing data related to the second data cartridge; and receiving the transmitted data signal at a second reader attached to the cartridge access device and oriented in a second direction opposite the first direction. The method may alternatively comprise the further steps of positioning the second end of the cartridge access device adjacent to a second data cartridge, and scanning bar code indicia on the second data cartridge with a scanner attached to the cartridge access device and oriented in the second direction.

DESCRIPTION OF THE PREFERRED EMBODIMENTS

Figure 1:
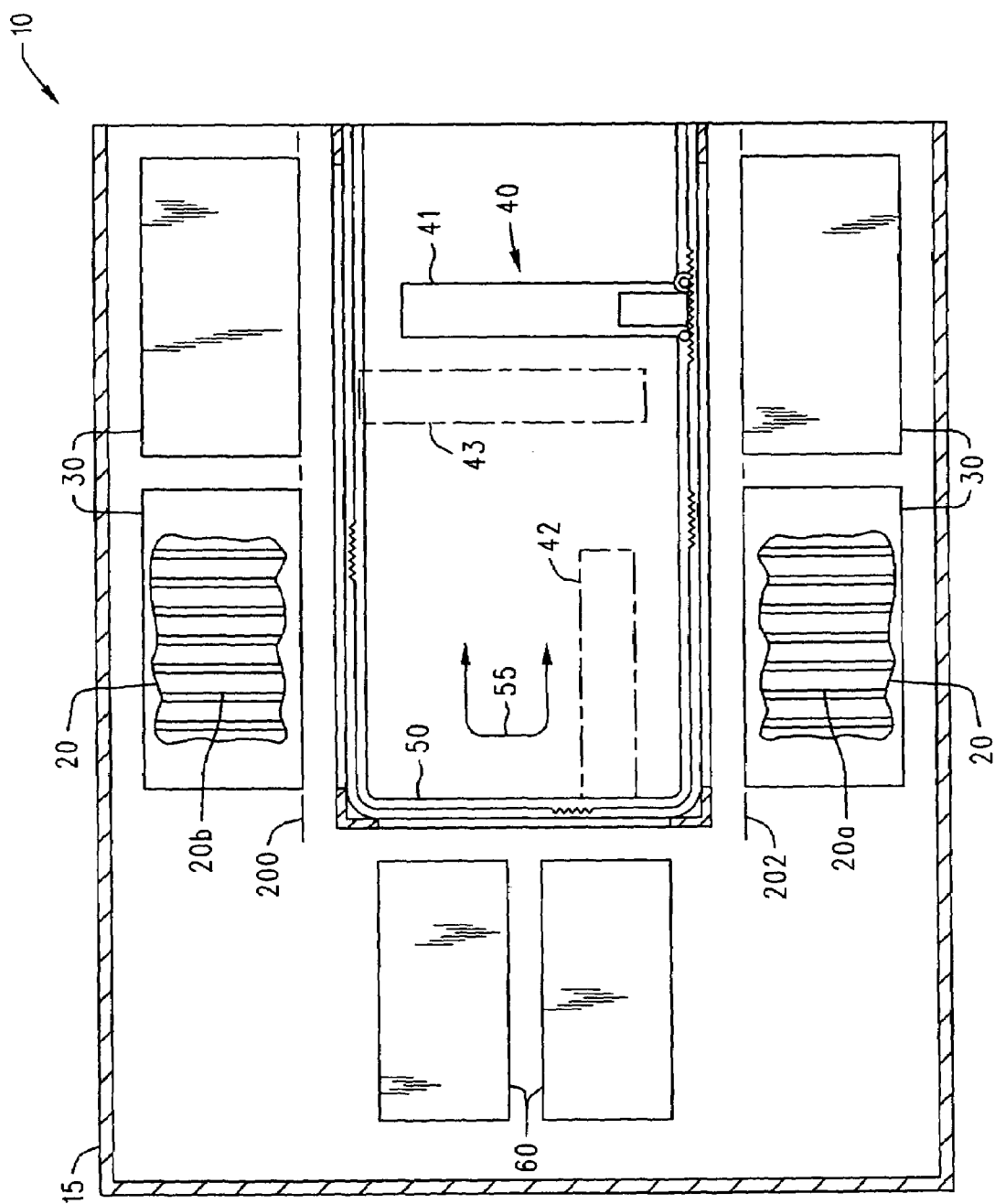
FIG. 1 is a plan view of a storage system that utilizes the apparatus for retrieving data according to one embodiment of the invention.

Apparatus 10 for retrieving data related to a data cartridge 20 is shown and described herein as it could be used with a data or media storage system 15. Briefly, media storage systems 15 are used to store large volumes of computer readable data. The computer readable data is typically stored on multiple data cartridges 20 that are arranged in the media storage system 15 on cartridge racks 30. It is therefore desirable to identify individual data cartridges 20 and the data stored thereon with as much information that is possible without having to physically remove the data cartridge 20 from the cartridge storage rack 30. The present invention relates to a method and apparatus for reading data related to the data cartridge 20.

The media storage system 15 may include a cartridge access device 40. The cartridge access device 40 can be moved among the cartridge storage racks 30 and positioned adjacent a data cartridge 20 to access the data cartridges 20 stored therein. According to the teachings of the invention, a reader 140 is mounted to the cartridge access device 40 and data related to the data cartridge 20 (e.g., cartridge ID, user, data origin, date, data format, load count, etc.) is stored in a transponder 150 mounted thereon. As such, the related data can be read from each data cartridge 20 as the cartridge access device 40 is moved among the storage racks 30 and each cartridge stored therein can be automatically inventoried. That is, where a user makes a request to inventory the data cartridges 20 stored in the media storage system 15, the related data (e.g., cartridge ID, data format, date, etc.) can be read from each data cartridge 20 as the cartridge access device 40 is moved among the storage racks 30 and the related data displayed or stored in a database for later use. Thus, when a request is made to read and/or write data to a data cartridge 20, the requested data cartridge 20 is readily recognized, removed from the storage rack 30, and delivered to the read/write device 60 for access to the computer readable data stored thereon. Likewise, where a data cartridge 20 is placed in a mail slot (i.e., a drop-off point, not shown) in the media storage system 15, the related data is read to identify the data cartridge 20 so that the data cartridge 20 is returned or entered at the appropriate position in the storage rack 30. Furthermore, the user may search for a data cartridge 20 as the cartridge access device 40 is moved among the storage racks 30 and the related data is read from the data cartridge 20 and transmitted to the user.

The method of the present invention preferably includes positioning the cartridge access device 40, and hence the reader 140, adjacent the data cartridge 20 and activating the transponder 150. The activated transponder 150 transmits a data signal containing the data related to the data cartridge 20, which is received at the reader and processed by the controller 147. For example, the related data may be displayed for a user browsing the media storage system 15, used to create an inventory for immediate or later use, used to identify a requested data cartridge 20, etc.

It is important to recognize that the data cartridges 20 may be closely packed in the storage rack 30. Therefore, the likelihood exists for interference with transponders 150 on nearby data cartridges 20. The invention addresses this concern by preferably mounting the reader 140 to a cartridge plunge mechanism 90 moveable between extended and retracted positions within the cartridge access device 40. Thus, the reader 140 can be extended toward the data cartridge 20 or retracted therefrom for more accurate positioning. In addition, mounting the reader 140 to the movable cartridge plunge mechanism 90 allows the reader 140 to be positioned near the data cartridge 20 without the reader 140 physically contacting the transponder 150. As such, the reader 140 and the transponder 150 are protected against physical wear.

It is also important to recognize that the mechanical tolerances (i.e., the distance between the data cartridge 20 and the cartridge access device 40) may vary from one media storage system 15 to another. Indeed, the mechanical tolerances may vary within a single media storage system 15 between one storage rack 30 and another or even between one data cartridge 20 and another. Therefore, in media storage systems 15 where mechanical tolerances vary, the reader 140 may not be sufficiently close to the transponder 150 in some instances. The invention addresses this concern by individually adjusting the position of the reader 140 at each data cartridge 20 using the cartridge plunge mechanism 90. That is, the cartridge plunge mechanism 90, and hence the reader 140 mounted thereto, can be extended or retracted to maintain the desired distance between the reader 140 and the transponder 150 at each data cartridge 20, regardless of the variability in the mechanical tolerances of the media storage system 15.

Having generally described methods and apparatus for retrieving the data related to a data cartridge 20 in a media storage system 15 and several advantages thereof, the methods and apparatus will now be described in further detail.

The apparatus 10 for retrieving data related to the data cartridges 20 may comprise a media storage system 15 such as that shown in FIG. 1. The media storage system 15 includes data cartridges 20 stored in one or more storage racks 30. In use, a control system (not shown) moves a cartridge access device 40 along a positioning rail 50 in direction 55 adjacent the data cartridges 20. Hence, according to the teachings of the invention, data related to a data cartridge 20 can be read (i.e., using standard protocols) when the cartridge access device 40 is positioned adjacent the data cartridge 20. For purposes of illustration, the cartridge access device 40 is shown in positions 41, 42, 43 in FIG. 1. The cartridge access device 40 is shown adjacent the data cartridge 20 contained in the storage rack 30 at positions 41 and 43, and is shown adjacent the read/write device 60 at position 42.

In use, a computer (not shown) linked to the media storage system 15 (e.g., via a direct connection, remote connection, network connection, etc.) may issue a request to access a data cartridge 20 or to inventory the data cartridges 20 stored in the media storage system 15. In response, the control system moves the cartridge access device 40 along the positioning rail 50 adjacent the data cartridges 20. Where access to a data cartridge 20 is requested, the control system positions the cartridge access device 40 adjacent the requested data cartridge 20, and signals the cartridge access device 40 to withdraw the data cartridge 20 from the storage rack 30 and to carry it to the read/write device 60 where the linked computer can access the computer readable data stored thereon. The requested data cartridge 20 can be readily identified from the data related to the data cartridge 20 and read at the cartridge access device 40, as explained in more detail below. Where the data cartridges 20 are to be inventoried, the related data is read from each data cartridge 20 as the access device 40 is moved about the media storage device 15. It is understood that the invention contemplates both reading the related data from each data cartridge 20 by stopping the cartridge access device 40 adjacent each data cartridge 20 and/or "on the fly" as the cartridge access device 40 is moving along the positioning rail 50.

Figure 2:
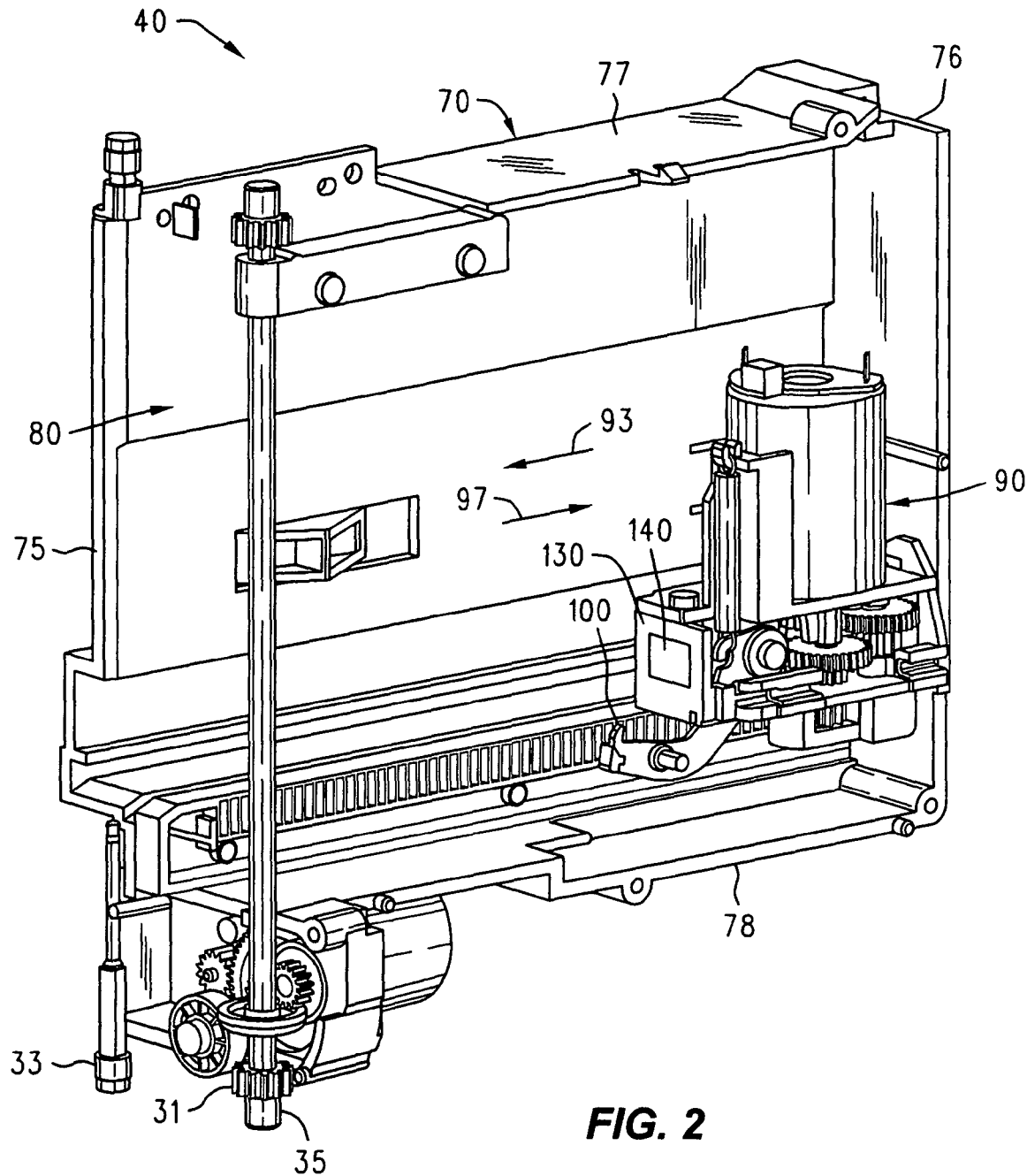
FIG. 2 is a perspective view of a cartridge access device associated with the data storage system with a side member removed to show a reader attached to a moveable cartridge plunge mechanism mounted within the cartridge access device.

The cartridge access device 40 shown in FIG. 2 may include a frame assembly 70 that defines a chamber or cavity 80 sized to receive the data cartridge 20 therein (e.g., for carrying it to the read/write device 60). A cartridge plunge mechanism 90 is slidably mounted to the frame assembly 70 so that the cartridge plunge mechanism 90 may be moved toward (i.e., extended) and away (i.e., retracted) from the cartridge access end 75 of the frame assembly 70, generally in the directions indicated by arrows 93 and 97, respectively. As such, the reader 140 can be mounted to the cartridge plunge mechanism 90 and thus be further positioned near the data cartridge 20 by moving the cartridge plunge mechanism 90 between the extended and retracted positions. The cartridge plunge mechanism 90 may also be provided with a finger assembly 100 configured to engage the data cartridge 20. The finger assembly 100 allows the cartridge plunge mechanism 90 to engage and withdraw the data cartridge 20 from the storage rack 30 and the read/write device 60 when so requested.

An optional encoder system (not shown) may provide an output signal from which information may be derived about the position of the cartridge plunge mechanism 90 within the frame assembly 70 (e.g., along the path indicated by arrows 93, 97). The encoder system can thus be used to determine the position of the reader 140 on the cartridge plunge mechanism 90 for positioning the reader 140 adjacent the data cartridge 20. In one embodiment, the encoder system may include an elongate linear reference member having a plurality of index marks thereon. A detector assembly (not shown) mounted to the cartridge plunge mechanism 90 detects the index marks on the elongated linear reference member and produces an output signal indicative of the presence or absence of an index mark. A picker control system (not shown) connected to the detector assembly may derive information relating to the position, velocity, and acceleration of the cartridge plunge mechanism 90 based on the output signal produced by the detector assembly. The picker control system may use such information to control the operation and movement of the cartridge plunge mechanism 90 in the directions of arrows 93 and 97.

Figure 3:
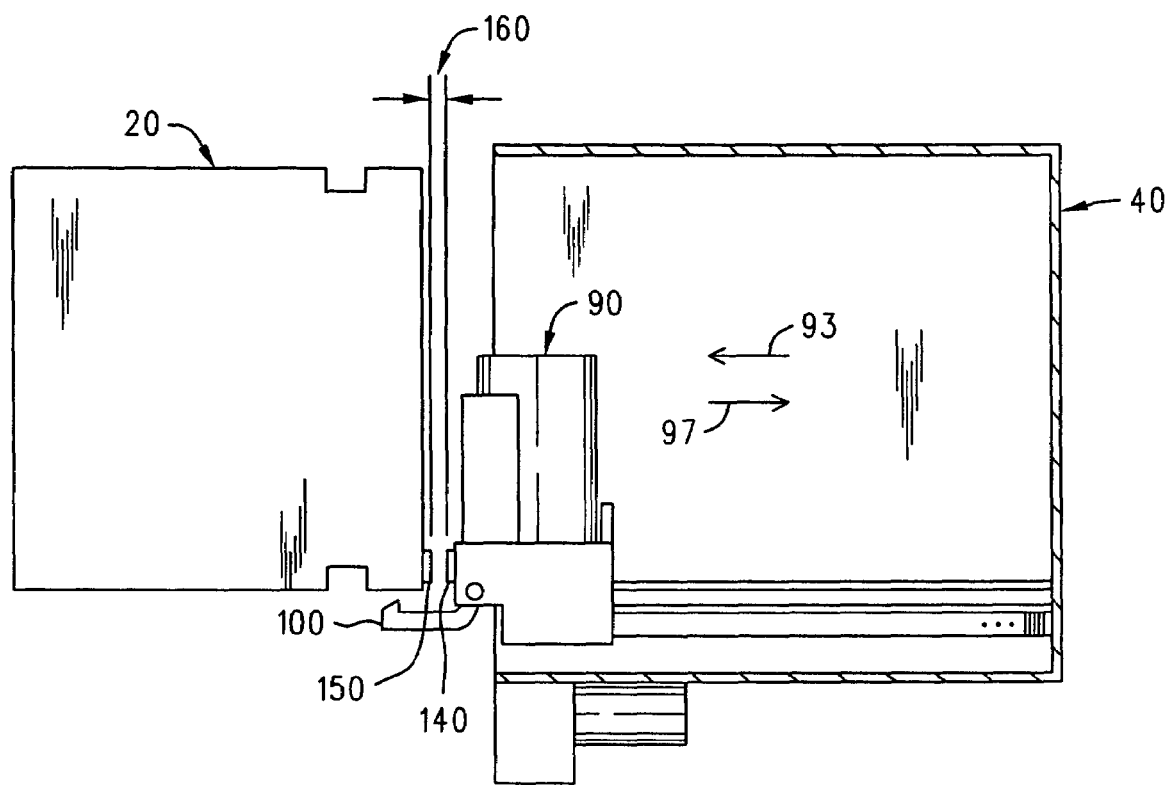
FIG. 3 is a simplified cross-sectional view of the cartridge access device with the cartridge plunge mechanism shown in the extended position so that the reader is positioned in close proximity to a transponder mounted to a data cartridge contained in the media storage system.

According to the teachings of the present invention, a reader 140 is mounted to the cartridge access device 40, preferably on a thumb portion 130 of the cartridge plunge mechanism 90, as shown in FIG. 2 and FIG. 3. In addition, a transponder 150 containing data related to the cartridge 20 is mounted to each cartridge 20 in the media storage system 15, as shown in FIG. 3. In use, the cartridge access device 40 is positioned adjacent the cartridge 20 (e.g., as in position 41 or 43 shown in FIG. 1) so that the reader 140 is within the transmission range 160 (FIG. 3) of the transponder 150 (e.g., forming an air interface therebetween). Once the reader 140 is within the transmission range 160 of the transponder 150, the reader 140 activates the transponder 150 and triggers a response (i.e., a data signal containing the related data) from the transponder 150, as described in more detail below.

The reader 140 is preferably mounted or attached to the thumb portion 130 of the cartridge plunge mechanism 90 so that the reader 140 can be extended toward the data cartridge 20 or retracted therefrom by moving the cartridge plunge mechanism 90 generally in the directions of arrows 93 and 97, respectively (e.g., using the encoder system discussed above). Thus, the reader 140 can be positioned close to the transponder 150, preferably within about three millimeters of one another. As an example, where the reader 140 is mounted to the cartridge access end 75 of the frame assembly 70, the reader 140 may receive a signal not only from the queried data cartridge 20, but also from the transponders 150 on other nearby data cartridges 20. Where, however, the reader 140 is mounted to the cartridge plunge mechanism 90, the reader 140 can be positioned immediately adjacent to the queried transponder 150 (as shown in FIG. 3), thus reducing the likelihood that transponders 150 on other nearby data cartridges 20 detect the query.

In addition, mounting the reader 140 to the cartridge plunge mechanism 90 also permits the reader 140 to be adjusted at each data cartridge 20 to be within the required transmission range 160 of the transponder 150 regardless of the variability in the mechanical tolerances of the media storage system 15. As an example, where the cartridge access device 40 is twenty millimeters from an adjacent data cartridge 20, the cartridge plunge mechanism 90 is extended beyond the cartridge access end 75 of the frame assembly 70 about seventeen millimeters, thus defining a transmission range 160 of about three millimeters. When the cartridge access device 40 is then moved adjacent another data cartridge 20 stored in the media storage system 15 where the cartridge access device is now twenty-five millimeters from the data cartridge 20, the cartridge plunge mechanism is extended beyond the cartridge access end 75 of the frame assembly 70 about twenty-two millimeters, once again defining a transmission range 160 of about three millimeters.

It is understood, however, that the transponder 150 and/or the reader 140 can be embedded in the data cartridge 20 and the cartridge plunge mechanism 90, respectively, or attached using any other suitable means (e.g., adhesive, integrally formed therein, etc.).

The preferred transmission range 160 of about three millimeters also serves to reduce or eliminate physical wear that may occur were the reader 140 and the transponder 150 to be in repeated contact with one another. However, the invention is not to be limited to the preferred transmission range 160 of three millimeters. In other embodiments, the reader 140 can come into contact with the transponder 150. Likewise, the transmission range 160 can be greater than three millimeters. The transmission range 160 may vary under the teachings of the present invention and may depend on design considerations such as the transmission and receiving capabilities of the reader 140 and the transponder 150, the likelihood of interference or crosstalk, etc. Other design considerations may include the respective power requirements of the reader 140 and the transponder 150, the signal detection capability of the reader 140, the transmission frequencies, the rate of transmission, etc.

Figure 4:
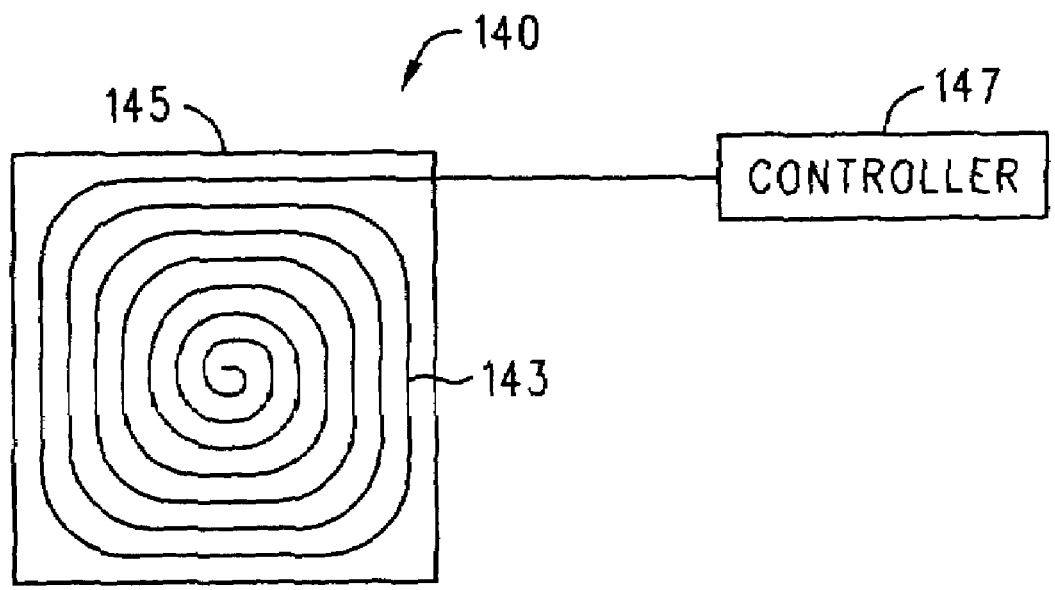
FIG. 4 is a plan view of the reader.

The exemplary reader 140 shown in FIG. 4 includes an antenna 143 (e.g. numerous turns of a fine wire to form a coil) etched on a flexible printed circuit substrate 145. The reader 140 is operatively associated with a controller 147. That is, the controller 147 is linked (via a direct or remote connection) with the reader 140 for communicating therebetween. For example, where the reader 140 is an inductive reader, the controller 147 may cause an electrical current to pass through the antenna 143, thus generating an energy field for activating the transponder 150. Once the transponder 150 is activated, the controller may transmit an interrogation signal through the antenna 143 querying the transponder 150. Likewise, when the reader 140 receives a response or a data signal from the transponder 150, the data signal is delivered to the controller 147 for further processing. For example, the controller may convert the data signal into user-readable data for output at a computer, generate or update an inventory database with the data relating to the data cartridge 20 contained in the data signal, etc. Although the controller 147 is shown separate from the circuit board 145, the reader 140 and the controller 147 can be fabricated together on a single circuit board (e.g., as an integrated circuit).

It is understood that the controller 147 and the reader 140 include any required circuitry and software or firmware for performing the functions described herein. The design of such controllers and readers is well known in the art. In addition, the controller 147 and the reader 140 can be used to perform any suitable functions, such as but not limited to, signal conditioning, parity error checking, correction, etc. Likewise, once the data signal is correctly received at the reader 140 from the transponder 150 and decoded at the controller 147, the controller 147 may instruct the transponder 150, through the reader 140, to cease transmitting. Where the transponder 150 is programmable, the controller 147 and reader 140 can also include circuitry to perform the necessary data modulation/demodulation and data transfer.

Figure 5:
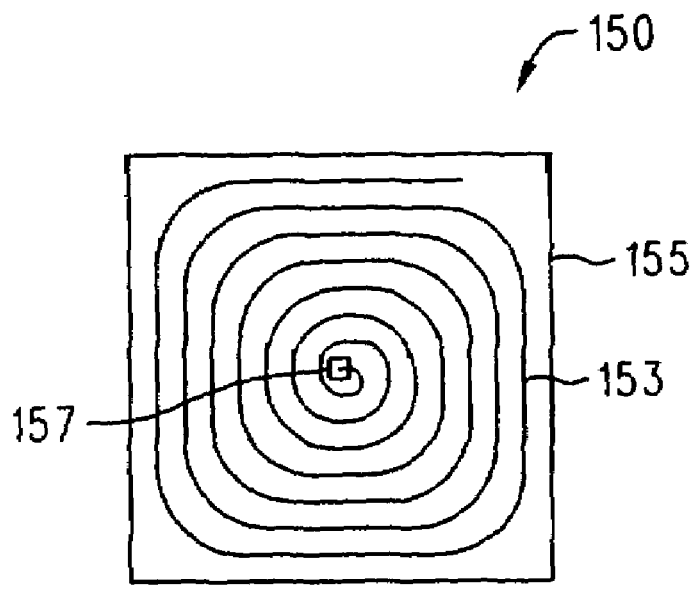
FIG. 5 is a plan view of the transponder.

The exemplary transponder 150 shown in FIG. 5 preferably includes a low powered integrated circuit (IC) 157 and an antenna 153 (e.g., numerous turns of a fine wire to form a coil) etched on a flexible printed circuit substrate 155. The IC 157 preferably includes a processor (or processing logic) and at least one memory. The processor receives the query signal from the reader 140 at the antenna 153. The processor retrieves data stored on the memory and generates a response or data signal containing the data requested by the query. The data signal is transmitted via the antenna 153 on the transponder 150 (e.g., via radio frequency) and received at the antenna 143 on the reader 140. While the transponder 150 is shown fabricated as a single printed circuit board, the transponder can comprise separate components linked to one another.

The transponder 150 can include any suitable memory. The memory may include Read Only Memory (ROM) for security data and operating system instructions, which in conjunction with the processor, controls internal functions (e.g., response delay timing, data flow control, and power supply switching). The memory may also include Random Access Memory (RAM) to facilitate temporary data storage during query and response. The memory may also include non-volatile programmable memory (e.g., Electrically Erasable Programmable Read Only Memory or EEPROM) to store data related to the data cartridge 20 that is retained therein when the transponder 150 is deactivated or in a power-saving mode. The memory may also include write-once/read many (WORM) memory, wherein the reader 140 and/or controller 147 could be configured (or a separate writing device provided) to write data to the transponder 150 (e.g., an indication of when or how often the data cartridge 20 is accessed). Likewise, data buffers may be used to temporarily hold incoming data following demodulation and outgoing data for modulation and interface with the reader 140. In addition, data stored in memory on the transponder 150 can be conventionally organized using data identifiers and error detection bits (i.e., source encoding).

The transponder 150 preferably stores up to four kilobytes of data related to the data cartridge 20. In one embodiment, the related data can be partitioned. For example, the related data may include device common information (e.g., remaining capacity, maximum capacity, tape alert flags, etc.), medium common attributes (e.g., manufacturer, serial number, etc.), and host common attributes (e.g., vendor, version, date last written, etc.). Likewise, the transponder may include permanent data and rewritable data. However, it is understood that the quantity of data stored on the transponder 150 can vary depending on the design characteristics of the transponder 150, the type of data stored thereon, etc. It is also understood that the type of data that is stored on the transponder 150 is immaterial to the scope of the present invention. For example, a user identification or passcode can be stored on the transponder 150 and suitable software can be provided to manage access to the data cartridge 20 based on the user identification and/or passcode. Such software can be readily developed by one skilled in the art.

The reader 140 and the transponder 150 preferably use radio frequency identification (RFID) technology. Generally, RFID transponders have small power requirements (e.g., in the microwatt to milliwatt range), and can be passive, active, or a combination thereof. That is, a passive RFID transponder derives power from a magnetic or electric field generated by the reader, while an active RFID transponder is self-powered by an internal battery. A combination passive/active RFID transponder is powered by an internal battery, but only draws power from the battery after being passed through a high energy activation field. RFID technology is well understood in the art. However, it is understood that the reader 140 and the transponder 150 are not limited to RFID technology and can include other storage and communication systems now known or later developed for storing and reading data related to the data cartridge 20.

It should be noted that although the apparatus and method of the present invention is illustrated using a particular media storage system 15, the teachings of the invention may be utilized in any of a wide range of media storage systems now known in the art or that may be developed in the future for accessing or taking inventory of one or more data cartridges 20. Accordingly, the present invention should not be regarded as limited to the particular media storage system 15 shown and described herein. It should also be noted that while the cartridge access device 40 is shown and described herein as it could be used to store and retrieve a linear tape open (LTO) data cartridge 20 having standard size and configuration, it is not limited to any particular type or style of data cartridge. Indeed, the cartridge access device 40 according to the present invention could be used with any type of media storage system comprising any type of storage medium (e.g., magnetic disk or tape, optical disk, etc.). Consequently, the present invention should not be regarded as limited to use with the media storage system 15 for the LTO data cartridge 20 shown and described herein.

FIGS. 6-9 illustrate further embodiments of the present invention utilized in a multi-plane media storage system 15 of the type shown in FIG. 1. In this type of system 15, the cartridge storage racks 30 may be positioned across from one another as shown, with data cartridges (e.g., 20a, 20b) facing one another, thereby defining multiple cartridge access planes 200, 202. As noted above, the cartridge access device 40 is translatable within the media storage system 15 in direction 55 in order to access any of the data cartridges 20.

In the embodiments illustrated in FIGS. 6-9, multiple data retrieval devices 210, 212, 214, 216 are attached to the cartridge access device 40 and are translatable therewith in order to read and store data from cartridges located in the multiple cartridge access planes 200, 202 (FIG. 1). In each embodiment, a first one of the data retrieval devices (210, FIGS. 6 and 7; 216, FIG. 8) is oriented in a first direction 220 (i.e., facing cartridge 20a), while a second one of the data retrieval devices (212, FIGS. 6 and 8; 214, FIG. 7) is oriented in a second direction 222 (i.e., facing cartridge 20b) which is opposite the first direction 220. The cartridge access device 40 has a front (or cartridge access) end 75 and a rear end 76 (see also FIG. 2), and the cartridge plunge mechanism 90 is translatable between the ends 75, 76 as described above.

Figure 6:
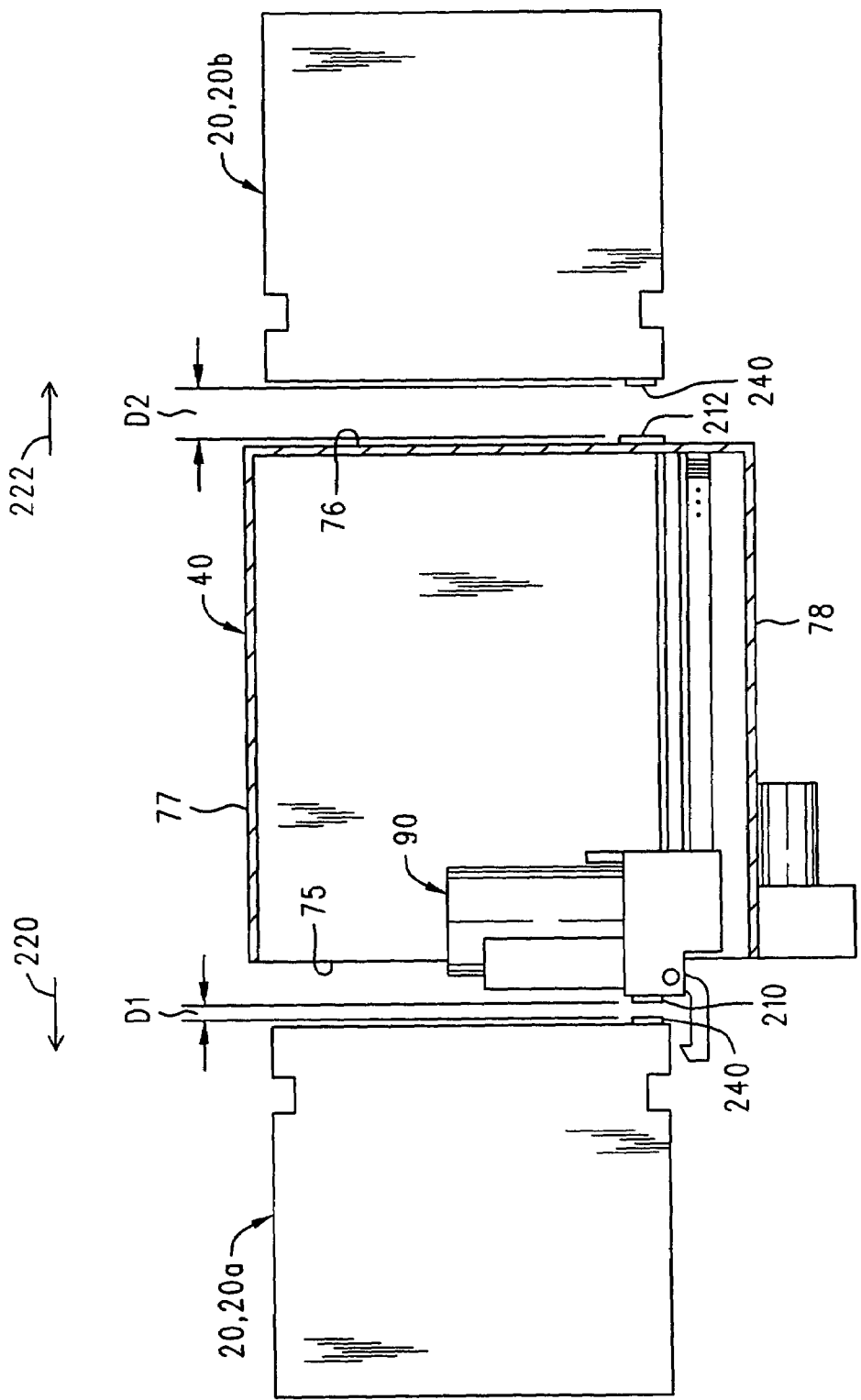
FIGS. 6-8 are simplified cross-sectional views of a cartridge access device having multiple data retrieval devices mounted thereon.
Figure 7:
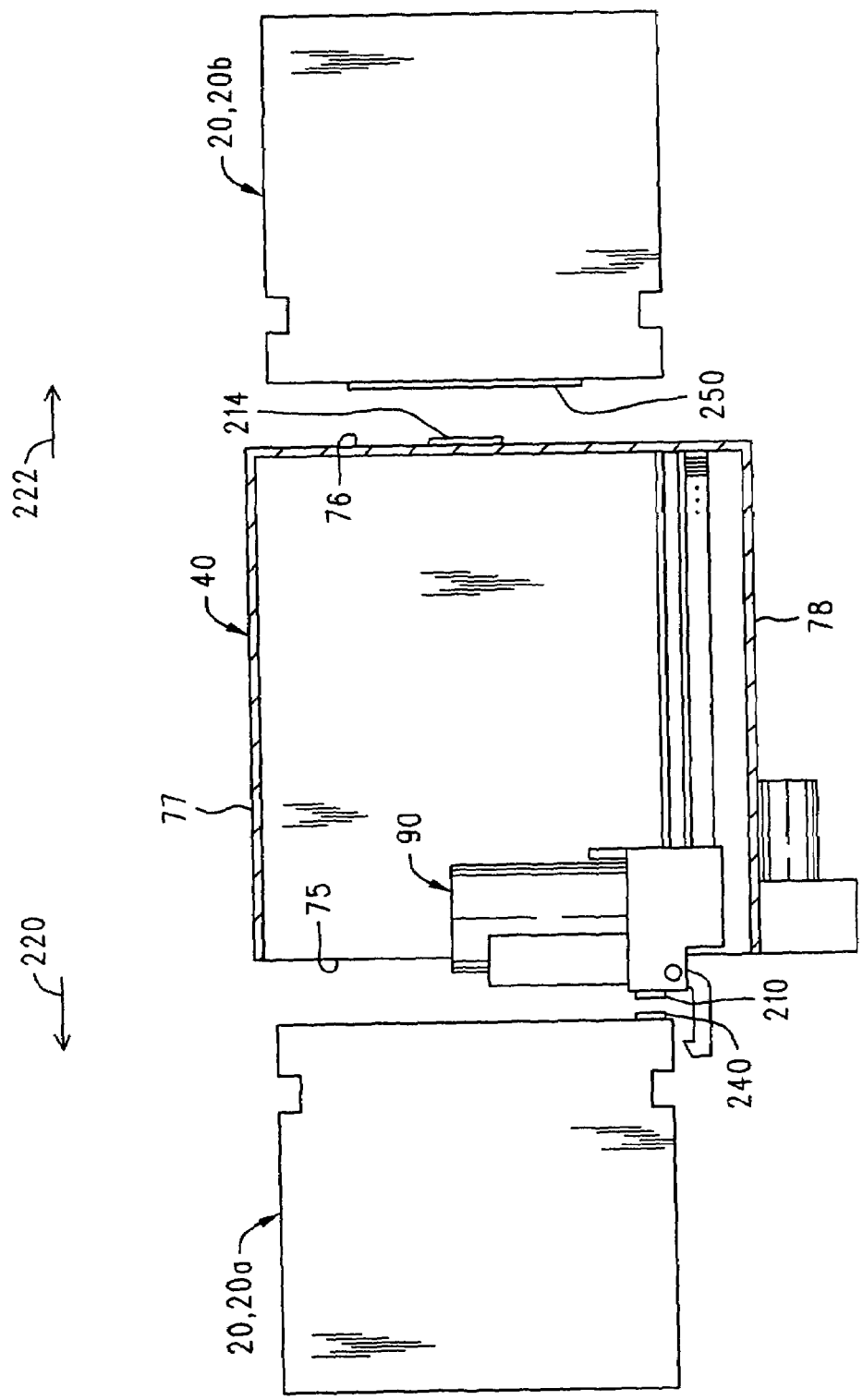
Figure 8:
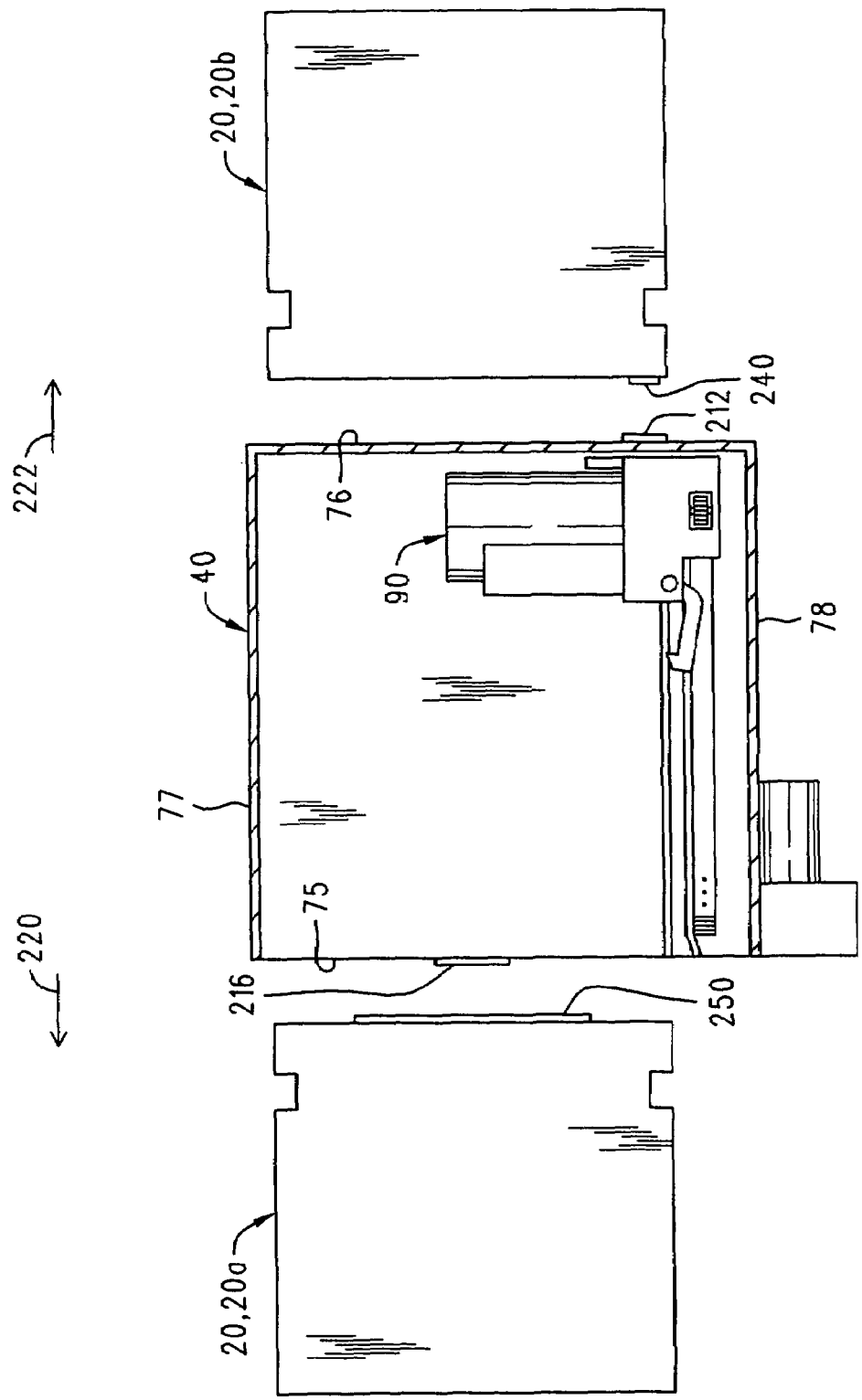

The data retrieval devices (210, FIGS. 6 and 7; 216, FIG. 8) which are oriented in the first direction 220 may be mounted in any convenient location on the cartridge access device 40. For example, as shown in FIGS. 6 and 7, the data retrieval device 210 may be mounted on the cartridge plunge mechanism 90 for the reasons described above relative to the reader 140. As shown in FIG. 8, the data retrieval device 216 may alternatively be mounted on the front end 75 of the cartridge access device 40. The data retrieval devices (212, FIGS. 6 and 8; 214, FIG. 7) which are oriented in the second direction 222 may also be mounted in any convenient location on the cartridge access device. For example, as shown in FIGS. 6-8, the data retrieval device 212, 214 may be mounted on the rear end 76 of the cartridge access device 40. In an alternative embodiment (not shown), any of the data retrieval devices 210, 212, 214, 216 may be mounted on the top 77 or bottom 78 (see also FIG. 2) of the cartridge access device 40.

As shown in FIG. 6, the data retrieval devices 210, 212 may be readers which are adapted to receive transmitted data signals from a transponder 240 located within each of the data cartridges 20. The readers 210, 212 may be substantially identical to the reader 140 described above except where otherwise noted below, and the transponder 240 may be identical to the transponder 150 described above. However, as indicated in FIG. 6, the distance D2 between the reader 212 (oriented in direction 222) and the transponder 240 may be greater than the distance D1 between the reader 210 (oriented in direction 220) and the transponder 240, thereby placing the reader 212 out of the normal transmission range (160, FIG. 3) of the transponder 240. In order to compensate for the increased distance, a larger, more powerful reader 212 may be provided at this end 76. Providing readers 210, 212 in two orientations 220, 222 significantly increases the speed and efficiency of the apparatus 10 (FIG. 1) of the present invention by allowing transponders 240 from data cartridges 20 in both cartridge access planes 200, 202 (FIG. 1) to be read simultaneously or in quick succession (i.e., information may be read from cartridge 20a and then immediately read from cartridge 20b without first having to translate the cartridge access device 40 around the system 15 to face cartridge 20b).

Figure 9:
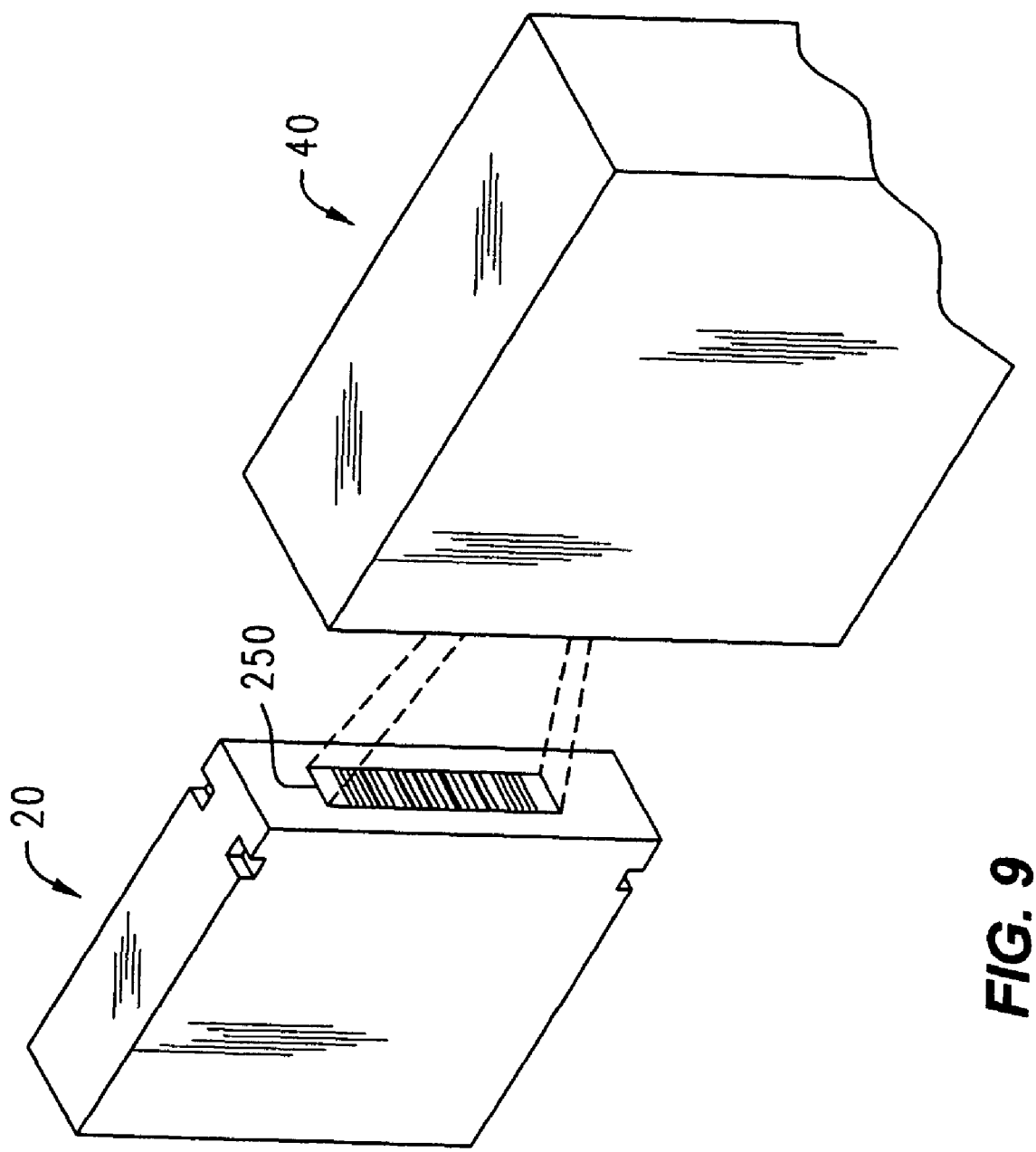
FIG. 9 is a simplified perspective view of a cartridge access device and cartridge with bar code indicia thereon.

As shown in FIGS. 7-9, one of the data retrieval devices 214, 216 may be a scanner which is adapted to retrieve information from bar code indicia 250 on each of the cartridges 20 (the scanning of bar code indicia 250 is schematically indicated by dashed lines in FIG. 9). The scanner 214, 216 may be any conventional bar code scanner such as, for example, the Microscan MS-810 Micro scanner, PN FIS-0810-0001 (see www.microscan.com). The information obtainable by a bar code scanner includes, for example, media/cartridge type, location of the cartridge within the media storage system 15, and other identifying information. Since the information obtainable by a bar code scanner 214, 216 may differ from the information obtainable by a reader 140, 210, 212, there is a clear advantage in terms of speed and efficiency in providing both types of data retrieval devices on a cartridge access device 40.

The scanner 214, 216 may be mounted in any convenient location on the cartridge access device 40 as described above. Examples of some of the possible locations are shown in FIGS. 7 and 8. FIG. 7 shows a reader 210 oriented in direction 220 mounted on a cartridge plunge mechanism 90 and a scanner 214 oriented in direction 222 mounted on the rear end 76 of the cartridge access device 90. FIG. 8 shows a scanner 216 oriented in direction 220 mounted on the front end 75 of the cartridge access device 90 and a reader 212 oriented in direction 222 mounted on the rear end 76 of the cartridge access device 90. A scanner (not shown) oriented in direction 220 may also be mounted on the cartridge plunge mechanism 90, while a reader 212 oriented in direction 222 may be mounted on the rear end 76 of the cartridge access device 90 as shown in FIG. 8.

Figure 10:
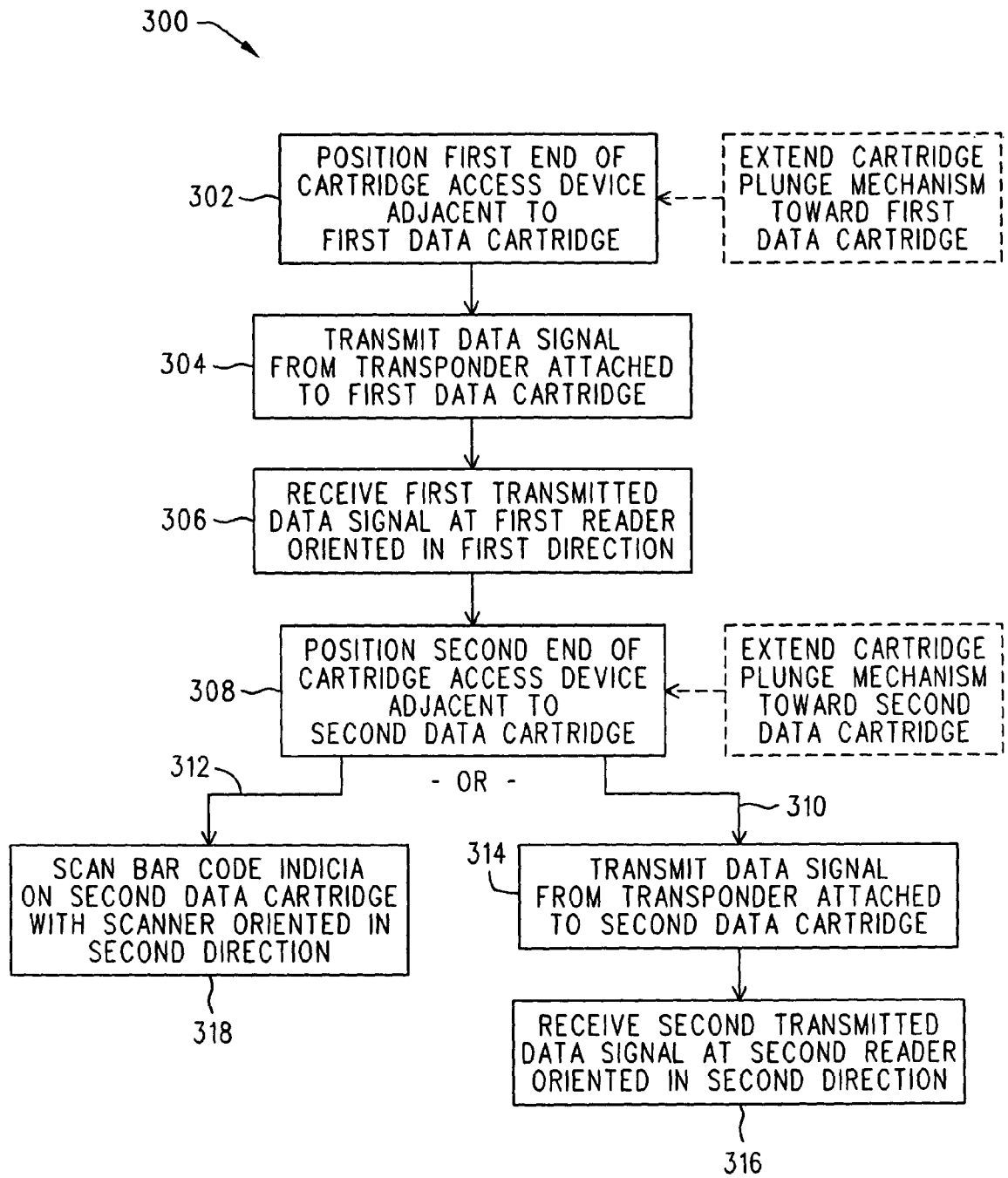
FIG. 10 is a flow chart illustrating a method for retrieving data related to multiple data cartridges in a multi-plane media storage system.

With reference to FIGS. 1-9 (and particularly to FIGS. 6-8), FIG. 10 illustrates a method 300 for retrieving data related to multiple data cartridges 20 in a multi-plane media storage system 15 (FIG. 1) of the type described above. The method 300 may comprise the first step 302 of positioning the first end (which may be the front end 75 or the rear 76) of the cartridge access device 40 adjacent to a first data cartridge (e.g., 20a or 20b, respectively). The next step 304 involves transmitting a data signal from a transponder 240 attached to the first data cartridge (20a or 20b), thereby producing a first transmitted data signal containing data related to the first data cartridge (20a or 20b). The next step 306 involves receiving the first transmitted data signal at a first reader (210 or 212) attached to the cartridge access device 40 and oriented in a first direction (220 or 222, respectively).

Simultaneously with or subsequent to the first step 302, the next step 308 involves positioning the second end (76 or 75, respectively) of the cartridge access device 40 adjacent to a second data cartridge (20b or 20a, respectively). Then, depending on whether a second reader 212, 210 or a scanner 214, 216 is provided, the method may follow either path 310 or 312 shown in FIG. 10. Following path 310, the next step 314 involves transmitting a data signal from a transponder 240 attached to the second data cartridge (20b or 20a, respectively), thereby producing a second transmitted data signal containing data related to the second data cartridge (20b or 20a). The final step 316 involves receiving the second transmitted data signal at a second reader (212 or 210) attached to the cartridge access device 40 and oriented in a second direction (222 or 220, respectively) which is opposite the first direction. Following path 312, the next and final step 318 involves scanning bar code indicia 250 on the second data cartridge (20b or 20a, respectively) with a scanner (214 or 216) attached to the cartridge access device 40 and oriented in a second direction (222 or 220, respectively) which is opposite the first direction.

As indicated by dashed lines in FIG. 10, the steps 302 or 308 of positioning the first/second end of the cartridge access device adjacent to a first/second data cartridge may also comprise extending the cartridge plunge mechanism toward the first/second data cartridge. This is performed in systems where a reader or scanner is mounted on the cartridge plunge mechanism as described above.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

The invention claimed is:

1. An apparatus for retrieving data related to multiple data cartridges contained in a media storage system having multiple cartridge access planes, comprising:
   a) a cartridge access device adapted to retrieve and transport said multiple data cartridges within said media storage system;
   b) a first data retrieval device operably attached to said cartridge access device and oriented in a first direction;
   c) a second data retrieval device operably attached to said cartridge access device and oriented in a second direction which is opposite said first direction;
   d) a chamber sized to receive at least one of said data cartridges;
   e) a cartridge plunge mechanism movably mounted at least partially within said chamber; and
   wherein, said plunge mechanism is movable in said first direction toward an extended position and in said second direction toward a retracted position.

2. The apparatus of claim 1, wherein said cartridge access device comprises a first end and a second end and wherein said first data retrieval device is mounted on said first end and said second data retrieval device is mounted on said second end.

3. The apparatus of claim 1, wherein said first data retrieval device is mounted on said plunge mechanism.

4. The apparatus of claim 1, wherein each of said first data retrieval device and said second data retrieval device is a reader which is adapted to receive transmitted data signals from a transponder located within each of said multiple data cartridges.

5. The apparatus of claim 1, wherein said cartridge access device is movably mounted relative to said media storage system.

6. The apparatus of claim 1 and further wherein:
   said cartridge access device further comprises an at least partially open cartridge access end located at one end of said chamber and an oppositely disposed closed end at another end of said chamber; and
   said extended position of said plunge mechanism is relatively closer to said cartridge access end and said retracted position of said plunge mechanism is relatively further from said cartridge access end.

7. The apparatus of claim 6 wherein said first data retrieval device is attached to said plunge mechanism and said second data retrieval device is attached to said closed end of said cartridge access device.

8. A method for retrieving data related to multiple data cartridges in a multi-plane media storage system comprising a cartridge access device having a first end and a second end, said method comprising:
   a) positioning said first end of said cartridge access device adjacent to a first data cartridge;
   b) transmitting a data signal from a transponder attached to said first data cartridge thereby producing a first transmitted data signal containing data related to said first data cartridge;
   c) receiving said first transmitted data signal at a first reader attached to said cartridge access device and oriented in a first direction;
   d) positioning said second end of said cartridge access device adjacent to a second data cartridge;
   e) transmitting a data signal from a transponder attached to said second data cartridge thereby producing a second transmitted data signal containing data related to said second data cartridge;
   f) receiving said second transmitted data signal at a second reader attached to said cartridge access device and oriented in a second direction which is opposite said first direction; and
   wherein, said cartridge access device comprises a chamber sized to receive at least one of said data cartridges and a cartridge plunge mechanism movably mounted at least partially within said chamber, said plunge mechanism being movable in said first direction toward an extended position and in said second direction toward a retracted position.

9. The method of claim 8, wherein said positioning said first end of said cartridge access device adjacent to a first data cartridge further comprises extending said plunge mechanism toward said first data cartridge.

10. The method of claim 8, wherein said positioning said first end of said cartridge access device adjacent to a first data cartridge and said positioning said second end of said cartridge access device adjacent to a second data cartridge are performed simultaneously.

11. The method of claim 8 and further comprising:
    moving said cartridge access device relative to said media storage system.

12. The method of claim 8 and further wherein:
    said first end of said cartridge access device comprises a cartridge access opening; and
    said extended position of said plunge mechanism is relatively closer to said first end and said retracted position of said plunge mechanism is relatively further from said first end.

13. The method of claim 8 wherein said first reader is attached to said plunge mechanism and said second reader is attached to said second end of said cartridge access device.

14. An apparatus for retrieving data related to multiple data cartridges contained in a media storage system having multiple cartridge access planes, comprising:
    a) means for retrieving and transporting said multiple data cartridges within said media storage system;
    b) first means for retrieving data from said multiple data cartridges, said first means being operably attached to said means for retrieving and transporting said multiple data cartridges within said media storage system, said first means for retrieving data being oriented in a first direction;
    c) second means for retrieving data from said multiple data cartridges, said second means being operably attached to said means for retrieving and transporting said multiple data cartridges within said media storage system, said second means for retrieving data being oriented in a second direction which is opposite said first direction;
    d) a chamber sized to receive at least one of said data cartridges;
    e) a cartridge plunge mechanism movably mounted at least partially within said chamber; and
    wherein, said plunge mechanism is movable in said first direction toward an extended position and in said second direction toward a retracted position.

15. The apparatus of claim 14 wherein said means for retrieving and transporting said multiple data cartridges is movable relative to said media storage system.

16. The apparatus of claim 14 and further wherein:
    said first means for retrieving data is attached to said plunge mechanism.

* * * * *